United States Patent [19]

Mallicoat

[11] Patent Number: 4,777,329

[45] Date of Patent: Oct. 11, 1988

[54] GRAPHIC INPUT SYSTEM

[75] Inventor: Samuel W. Mallicoat, Portland, Oreg.

[73] Assignee: Microfield Graphics, Inc., Beaverton, Oreg.

[21] Appl. No.: 90,088

[22] Filed: Aug. 24, 1987

[51] Int. Cl.[4] ............................................. G08C 21/00
[52] U.S. Cl. ...................................... 178/18; 340/706; 434/408
[58] Field of Search .......................... 178/18, 19, 20; 340/706, 709, 707; 434/408; 181/125, 123; 367/907

[56] References Cited

U.S. PATENT DOCUMENTS

| | | | |
|---|---|---|---|
| 3,838,212 | 9/1974 | Whetstone et al. | 179/18 |
| 3,886,311 | 5/1975 | Rodgers et al. | 178/18 |
| 3,904,822 | 9/1975 | Kamm et al. | 178/19 |
| 4,012,588 | 3/1977 | Davis et al. | 178/18 |
| 4,289,927 | 9/1981 | Rodgers | 178/19 |
| 4,492,819 | 1/1985 | Rodgers et al. | 178/18 |
| 4,616,106 | 10/1986 | Fowler et al. | 178/18 |
| 4,711,977 | 12/1987 | Miyamori et al. | 178/18 |

Primary Examiner—Stafford D. Schreyer
Attorney, Agent, or Firm—Stoel Rives Boley Jones & Grey

[57] ABSTRACT

A graphic input system determining position coordinate data of a mobile element on a writing surface by measuring the transit times of ultrasonic signals and an electromagnetic signal. The mobile element may comprise either a writing instrument or an eraser. The electromagnetic signal contains information that represents the color of ink used in the writing instrument and identifies the portion of the eraser in contact with the writing surface.

20 Claims, 6 Drawing Sheets

FIG. 3A ULTRASONIC SIGNAL 78
FIG. 3B ULTRASONIC SIGNAL 42
FIG. 3C ELECTROMAGNETIC WAVE SIGNAL 72
FIG. 3D TIMER ENABLE 46
FIG. 3E TIMER ENABLE 124

| Reference Number | Mobile Element Characteristic | Preset Value $B_5 B_4 B_3 B_2 B_1 B_0$ | LED Pulses | $T_{pw}(\mu sec)$ |
|---|---|---|---|---|
| 1 | Null | 0 0 0 0 0 0 | 0 | 0 |
| 2 | $EP_A$ | 0 0 0 1 0 0 | 4 | 105 |
| 3 | $EP_B$ | 0 0 1 0 0 0 | 8 | 210 |
| 4 | $ES_1$ | 0 0 1 1 0 0 | 12 | 315 |
| 5 | $EP_C$ | 0 1 0 0 0 0 | 16 | 420 |
| 6 | $ES_4$ | 0 1 0 1 0 0 | 20 | 525 |
| 7 | Black | 0 1 1 0 0 0 | 24 | 630 |
| 8 | Red | 0 1 1 1 0 0 | 28 | 735 |
| 9 | $EP_A$ | 1 0 0 0 0 0 | 32 | 840 |
| 10 | Blue | 1 0 0 1 0 0 | 36 | 945 |
| 11 | $ES_2$ | 1 0 1 0 0 0 | 40 | 1050 |
| 12 | Green | 1 0 1 1 0 0 | 44 | 1155 |
| 13 | $ES_3$ | 1 1 0 0 0 0 | 48 | 1260 |
| 14 | Violet | 1 1 0 1 0 0 | 52 | 1365 |
| 15 | Orange | 1 1 1 0 0 0 | 56 | 1470 |
| 16 | ET | 1 1 1 1 0 0 | 60 | 1575 |

GRAPHIC INPUT SYSTEM

TECHNICAL FIELD

This invention relates to graphic input systems and, in particular, to a graphic input system that determines position coordinate data of a mobile element on a surface from information carried by an electromagnetic wave.

BACKGROUND OF THE INVENTION

Conventional graphic input systems typically develop electrical signals that represent the position of a writing instrument or stylus on a writing surface. The signals are stored so that information written on the writing surface may be reproduced at a later time. Such systems are used in facsimile transmission and computer data input devices.

One type of graphic input system, such as that described in U.S. Pat. No. 3,886,311 of Rodgers, et al. ("Rodgers et al. '311 system"), employs a sensor tablet that includes a grid of built-in parallel conductors extending in the X and Y directions ("X-Y conductor grid system") along the writing surface of the tablet. DC voltages applied to the conductors provide a writing surface having a unique electrostatic field. In the Rodgers, et al. '311 system, a writing pen uses capacitive coupling to detect a specific position of the pen within the electrostatic field and to provide an output signal indicative of such position.

U.S. Pat. No. 3,904,822 of Kamm, et al., describes a similar system in which the pen includes a pickup coil that is inductively responsive to the X-Y conductors for producing an output voltage that indicates the position of the pen. U.S. Pat. No. 4,289,927 of Rodgers describes an X-Y conductor grid system in which the position of a pen is determined by the X-Y conductors sensing a magnetic field that the pen produces in response to an input signal. U.S. Pat. No. 4,492,819 of Rodgers, et al., describes an X-Y conductor grid system in which the position of a pen is determined by ratios of voltage levels of particular conductors that are produced by an electric field that is radiated by the pen. U.S. Pat. No. 4,616,106 of Fowler, et al., describes an X-Y conductor system in which a pen radiates an electrical signal (or alternatively a signal carried by an electromagnetic wave) and in which the position of the pen is indicated by relative voltage levels associated with the various conductors. Each of these systems is undesirable because of the considerable expense in manufacturing tablets with the X-Y conductor grids and the limitation of writing only on the specially manufactured tablets.

Other graphic input systems have employed sound waves to indicate the location of the writing instrument. U.S. Pat. No. 3,838,212 of Whetstone, et al., describes a system of this type in which a shock wave generated at the tip of a stylus propagates toward two sets of microphones that extend along the entire lengths of the X and Y margins of a writing surface. The position of the stylus is determined by the transit time of the shock wave traveling from the stylus to the microphones. This system suffers from the disadvantage of having an electrical connection between the stylus and the main system circuitry, which electrical connection is awkward and cumbersome for the user. U.S. Pat. No. 4,012,588 of Davis, et al., describes a system that generates at the tip of a stylus a shock wave that propagates toward microphones located at two points. The system determines the stylus position by employing triangulation equations that use the transit time of the shock wave. The system can also generate the shock wave from a third point, in which case the stylus acts as a passive reflector of the shock wave toward the two microphones. The systems of Whetstone, et al., and Davis, et al., are undesirable because sound waves are unsuitable for carrying certain information, such as the color of ink dispensed by the writing instrument.

SUMMARY OF THE INVENTION

The present invention relates to a graphic input system for determining position coordinate data of a mobile element on a writing surface. For example, the writing surface can be a commercially available erasable markerboard or "whiteboard," and the mobile element can be an ink-dispensing writing instrument or an eraser designed to be used with the whiteboard. The system comprises a stationary transmitter for transmitting sound wave signals and a mobile receiver connected to the mobile element for receiving the sound wave signals. The mobile element includes a mobile transmitter for transmitting a signal carried by an electromagnetic wave in response to the receipt of the sound wave signals. A stationary electromagnetic receiver receives the electromagnetic wave signal, which carries information from which a coordinate calculator computes the position coordinate data. To compute the position coordinate data, the graphic input system of the present invention uses a timer to determine the time elapsed between the transmission of the sound wave signals and receipt of the electromagnetic wave signal.

In a preferred embodiment, the stationary transmitter includes first and second transmitters that are separated by a fixed distance and transmit respective first and second sound wave signals. A transmitter distance determiner determines a transmitter distance that equals the distance between the first and second transmitters. If it is a writing instrument, the mobile receiver includes one sound wave receiver that receives the first and second sound wave signals. If it is an eraser, the mobile receiver includes two sound wave receivers that receive the first and second sound wave signals. Only one of these two receivers is enabled at a time.

The mobile transmitter transmits a signal carried by an electromagnetic wave in response to the receipt of either the first or second signals by the mobile receiver. A distance determiner determines for each receiver first and second distances that equal the distances between the first and second transmitter and each such sound wave receiver. The coordinate calculator calculates the position coordinate data from the transmitter distance, the first distance, and the second distance.

If the mobile element comprises a writing instrument, the electromagnetic wave can carry information indicating the color of ink dispensed and line width produced by the writing instrument.

If the mobile element is an eraser, the system can further comprise at least one switch for enabling the mobile transmitter while the eraser is pressed against the surface. Whenever it is enabled, the mobile transmitter transmits a unique electromagnetic wave carrying a signal that is indicative of the combination of switches activated. The electromagnetic wave signal can also indicate the size and shape of the eraser.

The sound wave signals can be of the ultrasonic type, and the electromagnetic wave signal can be of the infrared type.

Accordingly, an object of this invention is to provide a graphic input system for determining position coordinate data of a mobile element.

Another object of this invention is to provide such a system that employs sound wave signals and an electromagnetic wave signal to calculate the position coordinate data.

A further object of the invention is to provide such a system in which the mobile element is a writing instrument or an eraser.

Still another object of the invention is to provide such a system in which the mobile transmitter is enabled by at least one switch while the mobile element is in contact with a surface.

Yet another object of the invention is to provide such system that is compatible with existing surfaces.

Additional objects and advantages of the present invention will be apparent from the following detailed description of a preferred embodiment thereof, which proceeds with reference to the accompanying drawings.

DETAILED DESCRIPTION OF PREFERRED EMBODIMENT

Figure 1:
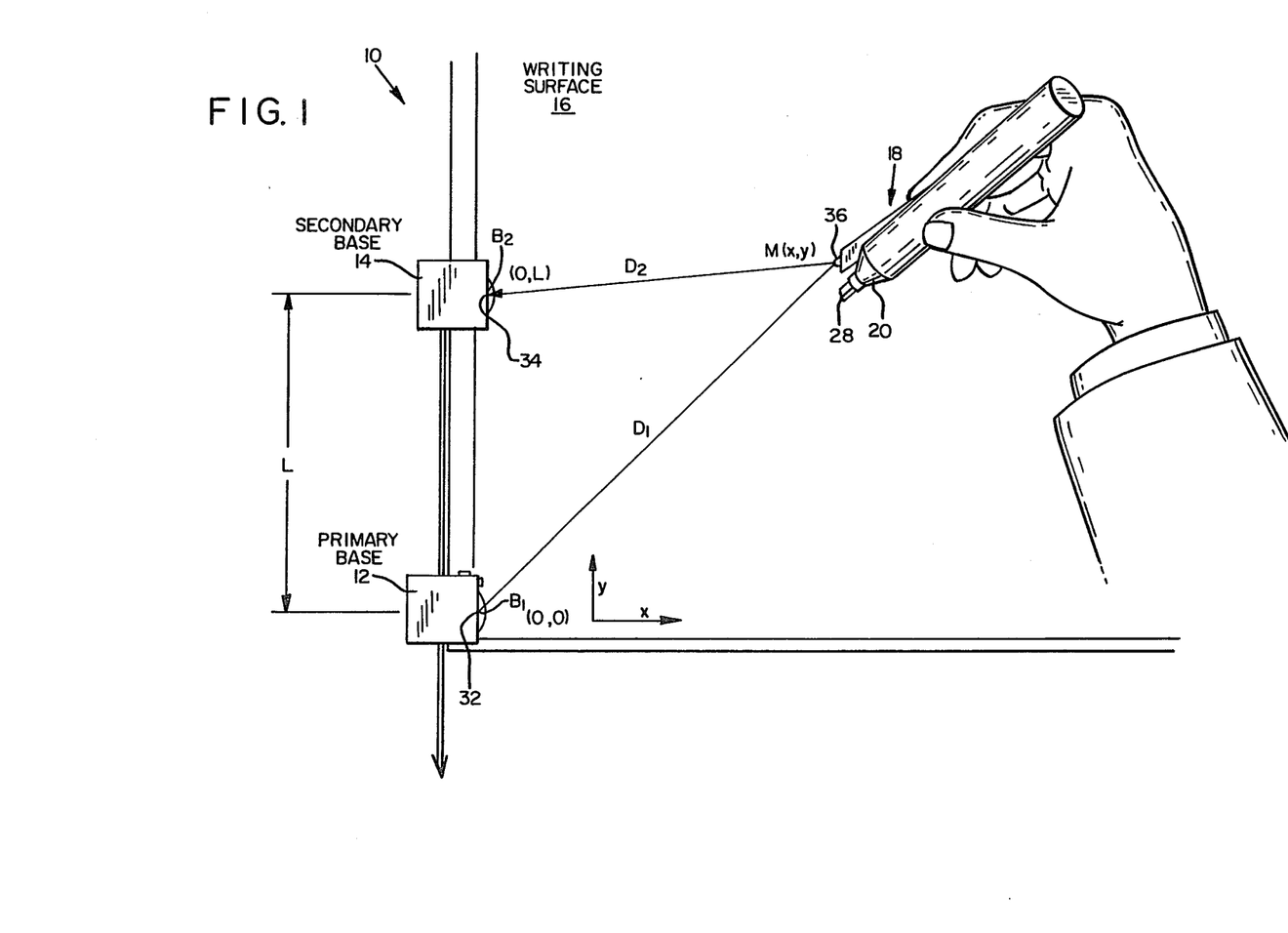
FIG. 1 is a pictorial diagram illustrating the arrangement of components of, and the use of a mobile element for carrying a writing instrument in, the display system of the invention.

Referring to FIG. 1, a preferred embodiment of the graphic input system 10 includes a primary sound wave transceiver base 12 and a secondary sound wave transmitter base 14 attached adjacent to the left side margin of a rectangular writing surface 16. To convey information through the use of writing surface 16, a user employs a sound wave-receiving and electromagnetic wave-transmitting mobile element, which in FIG. 1 comprises a mobile element 18 that includes a writing instrument 20 and in FIG. 7 comprises a mobile element 22 that includes an eraser 24. In the preferred embodiment, writing surface 16 is a standard commercially available erasable whiteboard, and writing instrument 20 and eraser 24 are, respectively, a dry erase marker pen and an eraser designed for use with such a whiteboard.

Graphic input system 10 employs sound wave communication among primary base 12, secondary base 14, and mobile element 18, and electromagnetic wave communication between mobile element 18 and primary base 12 to determine the x and y position coordinates of the tip 28 of writing instrument 20 on writing surface 16. This determination is made by assigning position coordinate locations $B_1$ and $B_2$ to primary base 12 and secondary base 14, respectively, and calculating from them the position coordinates of tip 28.

In particular, a primary sound wave transmitter 32 in primary base 12 is assigned the position coordinate location $B_1(O,O)$, with $x=0$ and $y=0$, and a secondary sound wave transmitter 34 in secondary base 14 is assigned the position coordinate location $B_2(O,L)$, with $x=0$ and $y=L$, where L represents the distance in the y direction between primary transmitter 32 and secondary transmitter 34. $D_1$ represents the distance between primary transmitter 32 and a microphone 36 in mobile element 18, and $D_2$ represents the distance between secondary transmitter 34 and microphone 36 in mobile element 18. Microphone 36 is assigned the position coordinate location $M(x,y)$. The x and y values of $M(x,y)$ can be determined according to triangulation equations:

$$x^2+y^2=D_1^2 \tag{1}$$

$$x^2+(y-L)^2=D_2^2. \tag{2}$$

Solving the simultaneous equations (1) and (2) provides the following expressions for the x and y position coordinates:

$$x^2=D_1^2-y^2 \tag{3}$$

$$D_1^2-y^2+(y-L)^2=D_2^2 \tag{4}$$

$$-2Ly+L^2+D_1^2=D_2^2 \tag{5}$$

$$y = \frac{(L^2 + D_1^2 - D_2^2)}{2L} \tag{6}$$

$$x=(D_1^2-y^2). \tag{7}$$

The x and y position coordinates for mobile element 18 can be calculated from equations (6) and (7) if L, $D_1$, and $D_2$ are determined. L may be determined by measuring the transit time $T_l$ of a sound wave traveling from secondary transmitter 34 in secondary base 14 to a microphone 40 located in primary base 12. L equals the transit time $T_L$ multiplied by the speed of sound (approximately 350 meters per second). $D_1$ may be determined by measuring the transit time $T_1$ of a sound wave traveling from primary transmitter 32 to microphone 36 in mobile element 18 and multiplying $T_1$ by the speed of sound. $D_2$ may be determined by measuring the transit time $T_2$ of a sound wave traveling from secondary transmitter 34 to microphone 36 and multiplying $T_2$ by the speed of sound.

Figure 2:
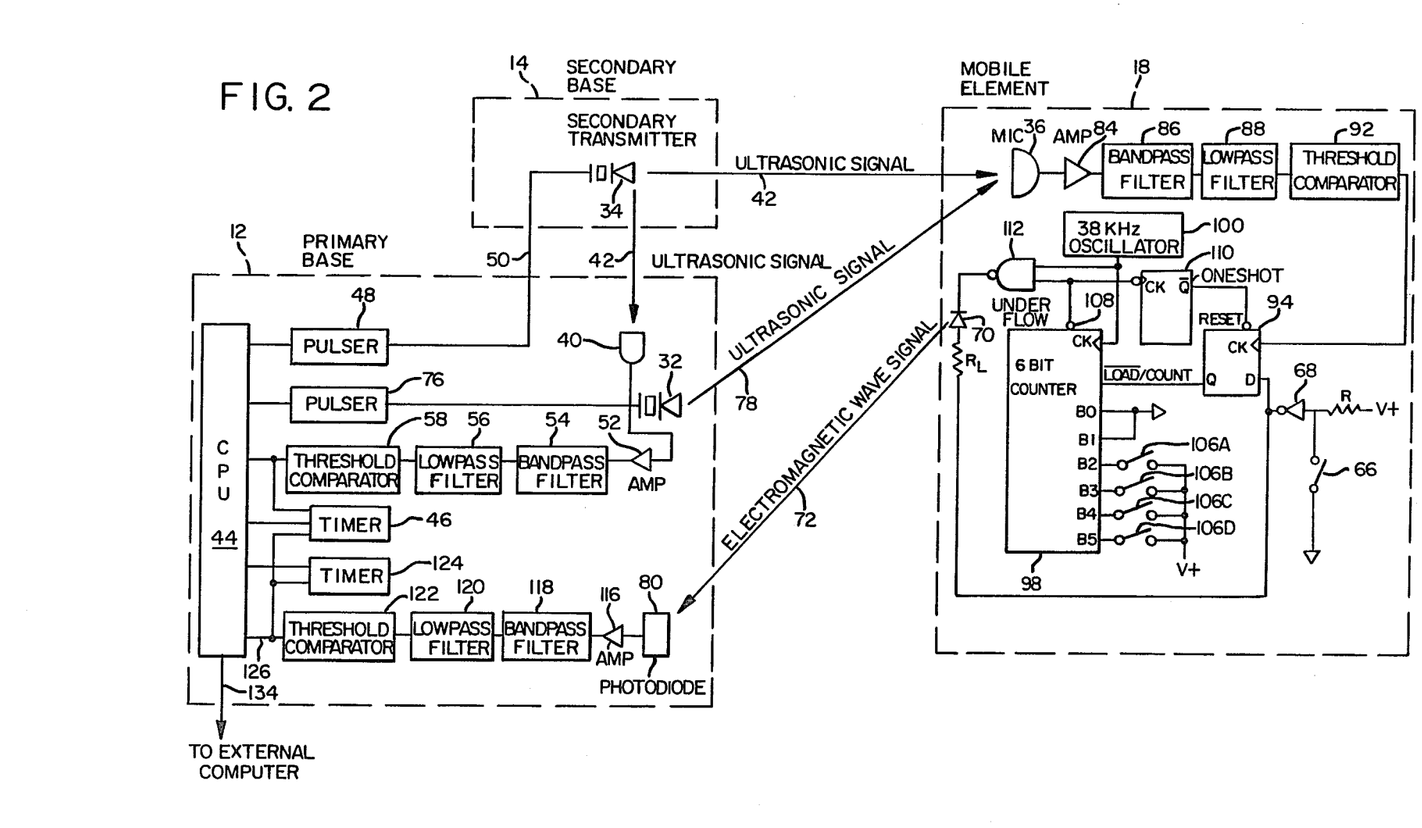
FIG. 2 is a system block diagram of the invention in which the display system uses a mobile element that includes a writing instrument.

The sound wave and electromagnetic wave communication among primary base 12, secondary base 14, and mobile element 18 can be described in greater detail by means of the block diagram in FIG. 2. Referring to FIG. 2, the distance L is determined by measuring the transit time $T_L$ of an ultrasonic signal 42 traveling from secondary transmitter 34 in secondary base 14 to microphone 40 in primary base 12, and multiplying $T_L$ by the speed of sound. To accomplish this measurement, a central processing unit (CPU) 44 located in primary base 12 concurrently starts a timer 46 and enables a pulser 48, which sends a 23 KHz electrical pulse of about 1 ms duration through a conductor 50 to an enable input of secondary transmitter 34. In response to the 23 KHz electrical pulse, secondary transmitter 34 transmits a 23 KHz ultrasonic signal 42 of about 1 ms duration.

Ultrasonic signal 42 is detected by microphone 40 and is amplified by an amplifier 52 located in primary base 12. A bandpass filter 54 passes the 23 KHz signal received by microphone 40, and a lowpass filter 56 passes the envelope defined by ultrasonic signal 42. Whenever the signal transmitted by lowpass filter 56 is of sufficient magnitude, a threshold comparator 58 stops timer 46 and alerts CPU 44 that ultrasonic signal 42 has been received. The elapsed time held by timer 46 represents the transit time $T_L$. CPU 44 reads the transit time $T_L$ from timer 46 and multiplies $T_L$ by the speed of sound to obtain L.

In the preferred embodiment, L is computed only once each time the system is turned on, and is then stored for future use in computing $D_1$ and $D_2$. However, L must be recomputed each time the distance between primary transmitter 32 and secondary transmitter 34 changes. If the distance between primary transmitter 32 and secondary transmitter 34 is a known, permanent distance, the value for L could be permanently stored, thereby rendering unnecessary microphone 40 and the associated signal processing circuitry described above. Secondary transmitter 34 is preferably a piezoelectric transducer that produces a 23 KHz sinusoidal pulse of constant amplitude. An ultrasonic signal of 23 KHz is out of the audio range but is of sufficient intensity to be detected by microphone 40.

Graphic input system 10 determines the position of mobile element 18 only when tip 28 of writing instrument 20 is in contact with writing surface 16. Tip 28 cooperates with a normally open two pole, single throw membrane switch 66 in writing instrument 20 such that whenever tip 28 is pressed against writing surface 16, switch 66 is closed. One pole of switch 66 is connected to ground, and the other pole of switch 66 is connected to the input of an inverter 68. A battery V+ is connected through a resistor R to the input of inverter 68.

Whenever tip 28 is not in contact with writing surface 16, switch 66 is open, thereby applying V+ to the input of inverter 68 and causing its output to be in the logic 1 state. The anode of a light emitting diode (LED) 70 is connected to the output of inverter 68 through a resistor $R_L$. If the anode of LED 70 is in the logic 1 state and the cathode of LED 70 is in the logic 0 state, LED 70 transmits an electromagnetic wave signal 72. If the anode of LED 70 is in the logic 0 state, no current will flow through, and no electromagnetic wave will be transmitted by, LED 70, regardless of the condition of the other circuitry in mobile element 18. As a result, graphic input system 10 cannot determine $D_1$ and $D_2$ when switch 66 is open.

FIGS. 3A-3E illustrate the timing relationships among certain signals developed by graphic input system 10 to determine $D_1$, $D_2$ and the characteristics of mobile element 18 indicated by a mobile element characteristic $T_{pw}$ (pulse width time). The horizontal time axes show the timing relationships among the signals and are not precisely scaled representations of them.

The timing relationships when switch 66 is open are shown from time $t_0$ to just prior to time $t_2$ in FIGS. 3A-3E. Referring to FIG. 2 and FIGS. 3A-3E, CPU 44 commences the computation of $T_1$ by concurrently starting timer 46 and enabling a pulser 76 at a time $t_0$. The enabling of pulser 76 causes primary transmitter 32 to transmit a 23 KHz ultrasonic signal 78 of about 1 ms duration that is detected by microphone 36, which is located in mobile element 18. At time $t_0$, tip 28 of writing instrument 20 is not in contact with writing surface 16; therefore, switch 66 is open, and the anode of LED 70 is in the logic 0 state so that no electromagnetic wave transmission takes place.

Timer 46 either stops in response to the detection by a photodiode 80 in primary base 12 of electromagnetic wave signal 72 or times out after the conclusion of a predetermined time interval. Since switch 66 in the open position causes no electromagnetic wave transmission, timer 46 times out at time $t_1$, as shown in FIG. 3D, and no value for $T_1$ is computed.

The length of the predetermined time depends on the length of the diagonal of the rectangular writing surface 16. For example, if writing surface 6 has a diagonal of 3 meters in length and mobile element 18 is located at the opposite end of the diagonal from either primary base 12 or secondary base 14, 8.6 ms (=3 meters/350 meters/s) would be required for sound to travel from either base 12 or 14 to mobile element 18. The predetermined time would, therefore, be approximately 8.6 ms but could be longer if it were desired that graphic input system 10 be responsive to echoes. Upon detection that timer 46 has timed out, graphic input system 10 repeats the above process to attempt to determine $T_1$.

The timing relationships when switch 66 is closed are shown from time $t_2$ to $t_4$ in FIGS. 3A-3E. Referring again to FIG. 2 and FIGS. 3A-3E, just prior to time $t_2$, tip 28 of writing instrument 20 comes into contact with writing surface 16 and switch 66 is closed causing the anode of LED 70 to be in the logic 1 state. Since the cathode of LED 70 is in the logic 1 state, current does not flow through LED 70 and there is no electromagnetic wave transmission. At time $t_2$, CPU 44 enables pulser 76 and thereby causes primary transmitter 32 to transmit ultrasonic signal 78. In addition, CPU 44 disables a conductor 130 between CPU 44 and threshold comparator 58 so that timer 46 will not turn off in response to the receipt of ultrasonic signal 78 by microphone 40.

Microphone 36, which is located in mobile element 18, detects ultrasonic signal 78. The output signal of microphone 36 is amplified by an amplifier 84 and is conditioned by a bandpass filter 86 having a 23 KHz center frequency. Bandpass filter 86 prevents mobile element 18 from enabling LED 70 in response to signals of frequencies other than those emitted by primary transmitter 32 and secondary transmitter 34. Lowpass filter 88 delivers the envelope defined by ultrasonic signal 78 to the input of a threshold comparator 92. Whenever the rising edge of the output signal of lowpass filter 88 is of insufficient magnitude to exceed a predetermined threshold voltage, threshold comparator 92 prevents the enabling of LED 70. This prevents the enabling of LED 70 in response to unwanted echoes of ultrasonic signals 42 and 78. Whenever the rising edge of the output of lowpass filter 88 is of sufficient magnitude to exceed the predetermined threshold, the output of threshold comparator 92 clocks D flip-flop 94. Only one rising edge is produced by each ultrasonic signal 78 of 1 ms duration.

Since switch 66 is closed, the D input of flip-flop 94 is in the logic 1 state. The Q output of flip-flop 94 is connected to the LOAD/COUNT input of a six-bit down counter 98. Whenever flip-flop 94 receives a clock pulse, the signal applied to the LOAD/COUNT input of down counter 98 changes from the logic 0 state to the logic 1 state and down counter 98, which is clocked by a 38 KHz oscillator 100, starts counting down from a preset binary word $B_5 B_4 B_3 B_2 B_1 B_0$ to 000000. $B_5$ and $B_0$ represent the most significant bit (MSB) and least significant bit (LSB), respectively. Preset bits $B_0$ and $B_1$ are set permanently in the logic 0 state. Bits $B_2$, $B_3$, $B_4$ and $B_5$ are connected to switches 106A, 106B, 106C, and 106D, respectively, with a common terminal connected to a DC voltage V+. If switches 106A-106D are open, the bits $B_2-B_5$ are in the logic 0 state, and if switches 106A-106D are closed, the bits $B_2-B_5$ are in the logic 1 state.

Whenever the signal applied to the LOAD/COUNT input of down counter 98 changes from the logic 0 state to the logic 1 state, the signal on underflow output 108 changes to the logic 1 state. Underflow output 108 changes to the logic 0 state when counter 98 reaches 000000, thereby causing the Q output of a negative edge-triggered one-shot 110 to reset flip-flop 94. The signal applied to the LOAD/COUNT input of down counter 98 changes to the logic 0 state when flip-flop 94 is reset.

Underflow output 108 and the output of a 38 KHz square wave oscillator 100 are connected to different inputs of NAND gate 112. Whenever the signal on underflow output 108 is in the logic 0 state, the output of NAND gate 112 is in the logic 0 state and electrical current does not flow through LED 70. Whenever the signal on underflow output 108 is in the logic 1 state, the output signal of NAND gate 112 is the inverse of the output waveform of oscillator 100 and LED 70 generates electromagnetic wave signal 72. In the preferred embodiment, electromagnetic wave signal 72 is of the infrared type and is similar to signals used in television remote control transmitters.

Figure 3A:
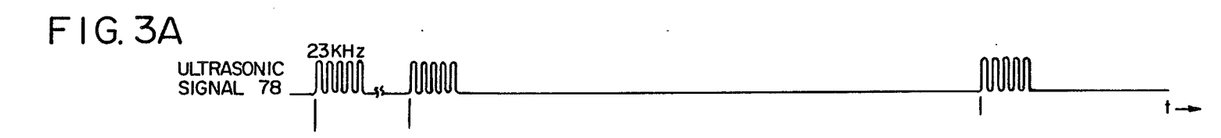
FIGS. 3A–3E are timing diagrams showing the timing of electrical signals developed by certain components of the system of the invention.
Figure 3B:
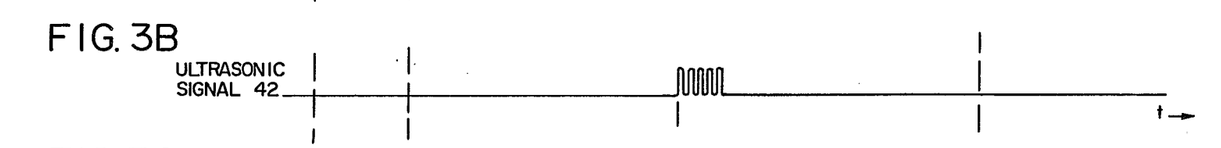
Figure 3C:
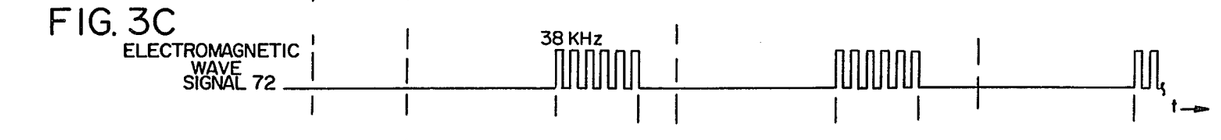
Figure 3D:
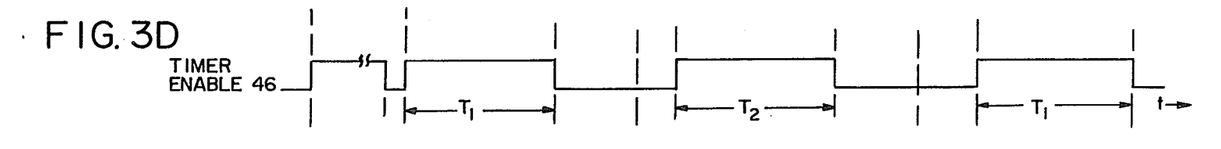

At time $t_3$, the signal on underflow output 108 is in the logic 1 state and LED 70 produces the 38 KHz electromagnetic wave signal 72, as shown in FIG. 3C. At just after time $t_3$, electromagnetic wave signal 72 is detected by photodiode 80. The output of photodiode 80 is amplified by an amplifier 116 and is conditioned by a bandpass filter 118 having a 38 KHz center frequency. Bandpass filter 118 prevents primary base 12 from responding to electromagnetic waves of frequencies other than the frequency of electromagnetic wave signal 72. A lowpass filter 120 delivers the envelope defined by electromagnetic wave signal 72 to the input of a threshold comparator 122, which compares the magnitude of electromagnetic wave signal 72 to a predetermined threshold. Threshold comparator 122 prevents CPU 44, timer 46, and a timer 124, which is described below, from responding to signals of insufficient magnitude received by photodiode 80. Such signals could be, for example, unwanted echoes of electromagnetic wave signal 72.

Figure 3E:
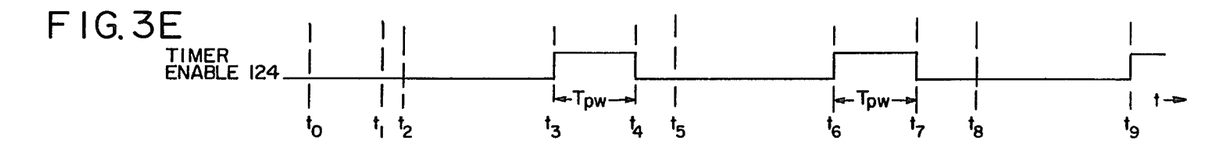

At just after time $t_3$, the output signal of threshold comparator 122 applied to a conductor 126 stops timer 46, starts timer 124, and alerts CPU 44 that electromagnetic wave signal 72 has been detected. Timer 124 measures $T_{pw}$. FIGS. 3C-3E show at time $t_3$ the electromagnetic wave signal 72 being produced, timer 46 being stopped, and timer 124 being started, respectively. (As stated above, timer 46 is stopped and timer 124 is started actually just after time $t_3$.) CPU 44 reads the elapsed time value recorded by timer 46 between $t_2$ and $t_3$. This value is denominated time $T_1$, as shown in FIG. 3D. If it is desired, a predetermined value representing the processing delays in graphic input system 10 may be stored in CPU 44 and subtracted from time $T_1$. Following time $t_3$, CPU 44 calculates $D_1$, which equals $T_1$ multiplied by the speed of sound.

At time $t_4$, down counter 98 counts to 000000, thereby causing the signal on underflow output 108 of down counter 98 to change to the logic 0 state and LED 70 to stop generating electromagnetic wave signal 72. At just after time $t_4$, the output signal of threshold comparator 122 on conductor 126 is in the logic 0 state, which stops timer 124 and alerts CPU 44 that timer 124 has been stopped. CPU 44 reads the elapsed time value recorded by timer 124 between $t_3$ and $t_4$. This value is denominated Thd pw, which indicates characteristics of mobile element 18.

As was stated above, the time duration $T_{pw}$ of electromagnetic wave signal 72 is set by the preset value of counter 98. If the mobile element comprises writing instrument 20, the value of $T_{pw}$ indicates the color of ink, with different preset values representing different colors. If the mobile element comprises eraser 24, the value of $T_{pw}$ indicates the contact orientation of eraser 24. The contact orientation of eraser 24 indicates the portion of eraser 24 that contacts writing surface 16. The preset value is determined by preset bits $B_5$, $B_4$, $B_3$, $B_2$. Bits $B_2-B_5$ are set by switches 106A-106D, respectively. If switches 106A-106D are open, then bits $B_2-B_5$ are in the logic 0 state. If switches 106A-106D are closed, the bits $B_2-B_5$ are in the logic 1 state. In the preferred embodiment, switches 106A-106D in the mobile element are preset at the factory, but they may be adjusted by the user.

Figure 4:
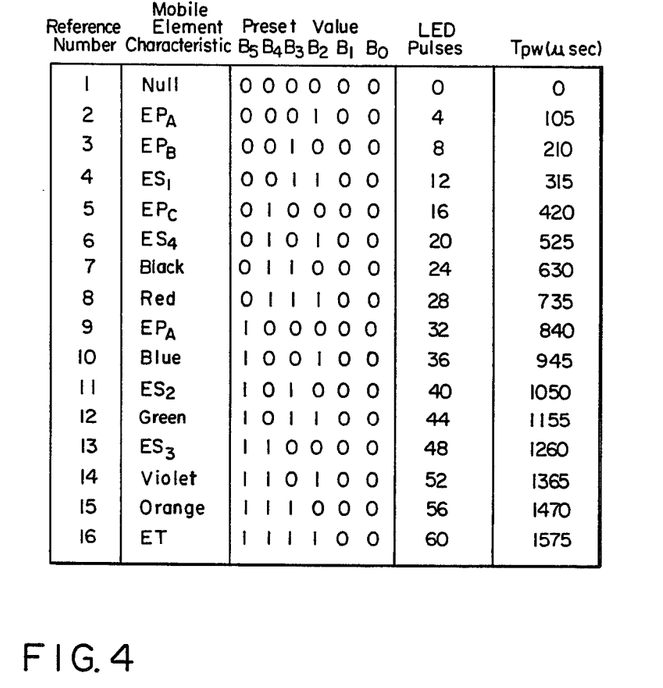
FIG. 4 is a chart indicating the characteristics and contact orientations of two mobile element according to the invention.

FIG. 4 shows a chart of mobile element characteristics that are indicated by the value of $T_{pw}$. Referring to FIG. 4, the column labeled "reference number" includes reference numbers that identify the characteristics described below. The column labeled "mobile element characteristic" includes nomenclature that indicates the color ink used in writing instrument 20 and the contact orientation of eraser 24.

Reference numbers 7, 8, 10, 12, 14, and 15 indicate that writing instrument 20 is used with black, red, blue, green, violet, and orange ink, respectively. Of course, graphic input system 10 is not limited to this choice of colors, and more than six colors can be used if a preset bit $B_6$ is added to down counter 98, making it a seven bit counter. Reference numbers 2-6, 9, 11, 13 and 16 will be discussed in connection with FIGS. 5-7. The column labeled "LED pulses" indicates the number of 38 KHz pulses that comprise electromagnetic wave signal 72, and the column labeled "$T_{pw}$ ($\mu$sec)" indicates the approximate value of $T_{pw}$ in microseconds. The value of $T_{pw}$ equals the number of LED pulses divided by 38 KHz. For example, 8/38 KHz=210 microseconds.

With respect to writing instrument 20, the line width of tip 28 could be conveyed if, for example, the chart of FIG. 4 included information representing a fine point pen and further included reference numbers indicating that the same colors were used with a wider point pen. The line width information could be preprogrammed or derived from the applied force between tip 28 and writing surface 16. With respect to eraser 24, its size and shape could be conveyed if, for example, the chart of FIG. 4 included different sets of numbers representing such information. Otherwise, the size and shape of eraser 24 would be stored in CPU 44 or in the memory of an external computer that communicates with graphic input system 10.

Having determined L, $D_1$, and $T_{ps}$, CPU 44 next determines $D_2$ in the same manner as it determined $D_1$, except that CPU 44 enables pulser 48 (instead of pulser 76) to cause secondary transmitter 34 to transmit ultrasonic signal 42. More specifically, at time $t_5$, CPU 44 concurrently starts timer 46 and causes secondary transmitter 34 to transmit ultrasonic signal 42. Electromagnetic wave signal 72 is transmitted at time $t_6$ in the same manner as that at time $t_3$. Shortly after time $t_6$, timer 46 is stopped and timer 124 is started. The elapsed time value recorded by timer 46 is $T_2$. CPU 44 calculates $D_2$, which equals $T_2$ multiplied by the speed of sound. After the conclusion of electromagnetic signal 72 at time $t_7$, timer 124 is stopped. The elapsed time recorded by timer 124 from $t_6$ to $t_7$ is $T_{pw}$, which should be the same as the value of $T_{pw}$ determined from $t_3$ to $t_4$.

Having determined L, $D_1$, $D_2$ and $T_{pw}$, CPU 44 calculates the y position coordinate according to equation (6), $y=(L^2+D_1^2-D_2^2)/2L$, and the x position coordinate according to equation (7), $x=(D_1^2-y^2)$. CPU 44 then delivers a signal on its output 134 to the external computer to indicate that sample position coordinate data x, y, and $T_{ps}$ are ready to be read. X, y and $T_{pw}$ are produced in AUTOCAD format. The external computer employs an AUTOCAD program which is available from the Autodesk Corporation. AUTOCAD is a trademark of the Autodesk Corporation. The external computer includes a memory map to store information indicating the position and characteristics of written information on writing surface 16. The $T_{pw}$ value indicates to the external computer the color of ink used and that the x, y position coordinates are to be written into the map memory rather than to be erased from it.

CPU 22 next obtains another set of sample position coordinate data x, y, and mobile element characteristic $T_{pw}$ in the same manner as that described above. It will be appreciated that L does not have to be recomputed unless the position of primary base 12 or second base 14 has changed.

Figure 5:
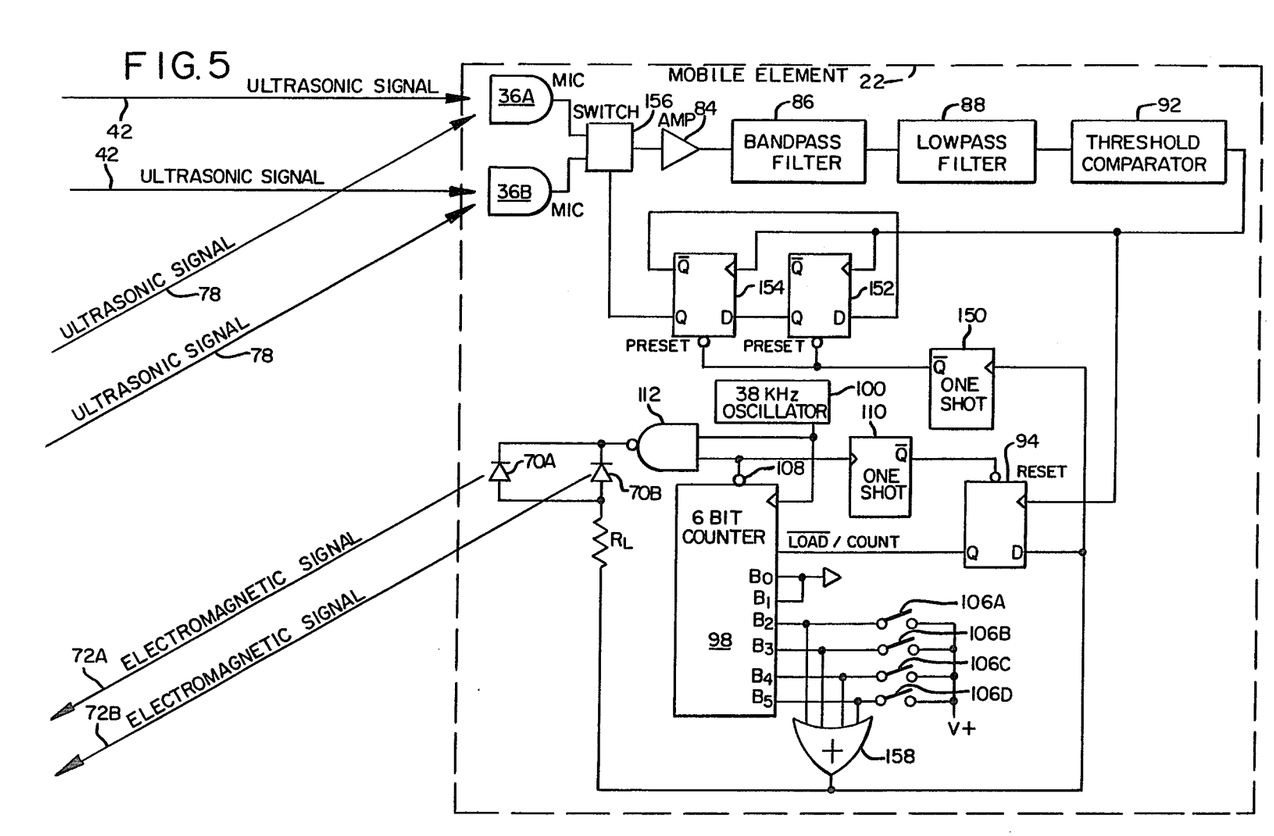
FIG. 5 is a block diagram of a mobile element that includes an eraser according to the invention.
Figures 7, 8:
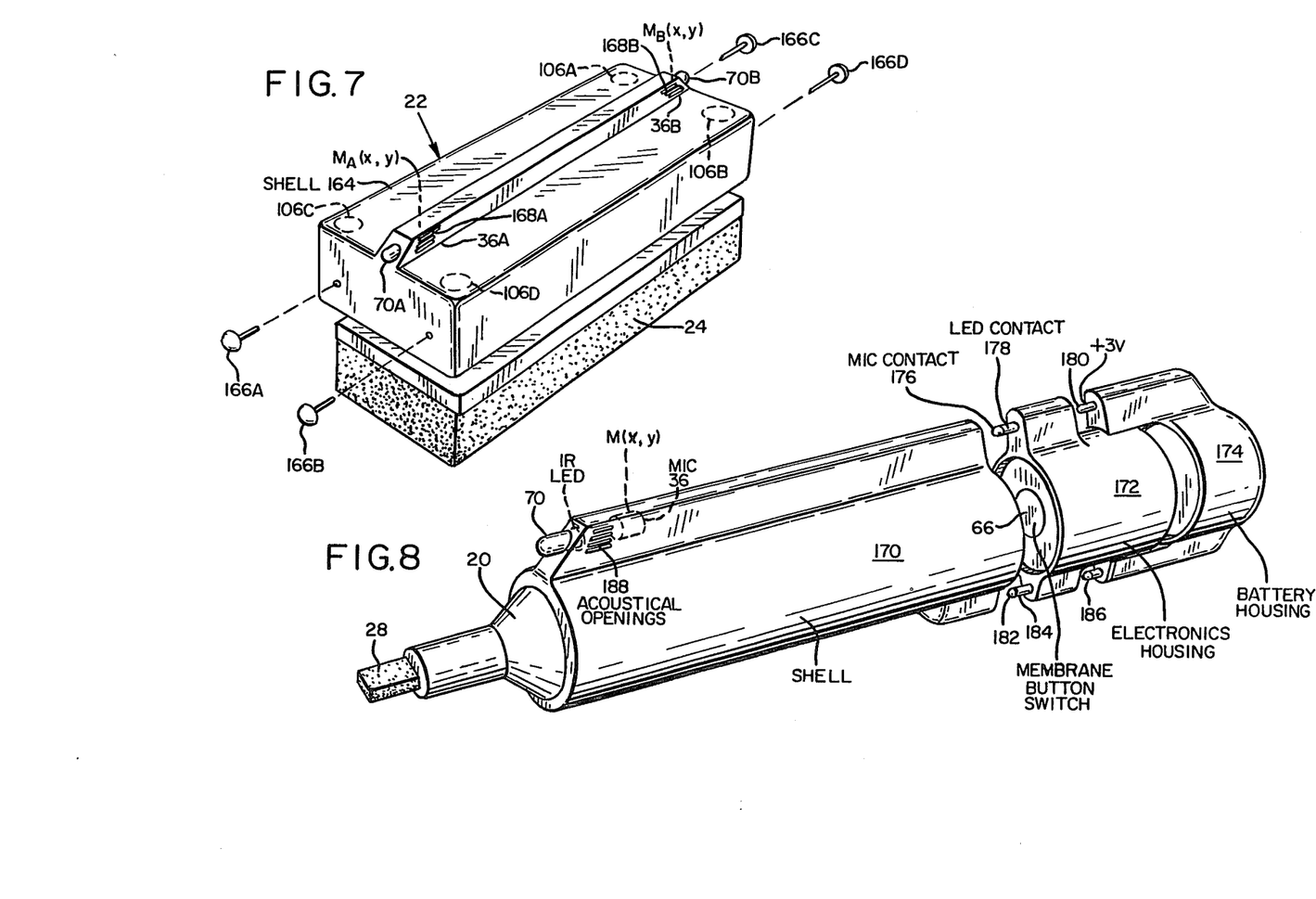
FIG. 7 is an exploded view of a mobile element of which an eraser comprises a portion.
FIG. 8 is an exploded view of a mobile element of which a writing instrument comprises a portion.

FIG. 5 shows the circuitry used in mobile element 22, which includes the eraser 24 illustrated in FIG. 7. The circuitry of mobile element 22 as shown in FIG. 5 is identical with the circuitry of mobile element 8 as shown in FIG. 2, except that microphone 36A and microphone 36B replace microphone 36; LED 70A and LED 70B replace LED 70; and the circuitry of mobile element 22 additionally includes a one-shot 150, a D flip-flop 152, a D flip-flop 154, a switch 156, and an OR-gate 158 but does not include switch 66, resistor R, and inverter 68.

Referring to FIG. 7, mobile element 22 includes a shell 164 that contains all of the circuitry shown in FIG. 5. Eraser 24 is releasably attached to shell 164 by removable tacks 166A-166D. Microphones 36A and 36B are located at points $M_A(x,y)$ and $M_B(x,y)$ on shell 164. Acoustic openings 168A and 168B near microphones 36A and 36B, respectively, accept ultrasonic signals 42 and 78.

The operation of graphic input system 10 when used to determine the position of mobile element 22 is essentially the same as that used to determine the position of mobile element 18 as described in connection with FIGS. 2 and 3. To determine the position of mobile element 22, graphic input system 10 treats mobile element 22 as though it were two points located at points $M_A(x,y)$ and $M_B(x,y)$. Using the same processing as described in connection with FIGS. 2 and 3, graphic input system 10 determines at different times the position of $M_A(x,y)$ and $T_{pw}$ and the position of $M_B(x,y)$ and $T_{pw}$. Microphone 36A and microphone 36B are connected to switch 156, which is controlled by the Q output of flip-flop 154. Whenever the Q output is in the logic 1 state, switch 156 provides a conduction path for the output of microphone 36A. Whenever the Q output is in the logic 0 state, switch 156 provides a conduction path for the output of microphone 36B.

Flip-flop 152 and flip-flop 154 are clocked by the rising edge of the signal on the output of threshold comparator 92. Flip-flops 152 and 154 are interconnected such that the logic state of the Q output of flip-flop 154 changes after every other rising edge of the clock signal applied to it. Switch 156 provides, therefore, the conduction path for the output of microphone 36A for two successive rising edges of the output signal of threshold comparator 92. Switch 156 then provides the conduction path for the output of microphone 36B for the two next succeeding rising edges of the output signals of threshold comparator 92. Although in the preferred embodiment CPU 44 does not receive information that would identify the microphone output passed by switch 188 at a given time, electromagnetic wave signals 72A and 72B could be optionally encoded with such information.

To determine D for either $M_A(x,y)$ or $M_B(x,y)$, CPU 44 enables timer 46 and causes primary transmitter 32 to transmit ultrasonic signal 78, which is detected by both microphone 36A and microphone 36B. It is unimportant whether switch 156 provides a conduction path for the output of microphone 36A or microphone 36B. For purposes of the following description, it is assumed that the Q output of flip-flop 154 is in the logic 0 state so that switch 156 passes only the output of microphone 82B. Amplifier 84, bandpass filter 86, lowpass filter 88, threshold comparator 92, flip-flop 94, down counter 98, one-shot 110, oscillator 100, and NAND gate 112 each operate in the same manner as that described with reference to FIG. 2 for mobile element 18. Instead of transmitting one electromagnetic wave signal 72, however, mobile element 22 transmits an electromagnetic wave signal 72A from LED 70A and an electromagnetic wave signal 72B from LED 70B. LED 70A and LED 70B, which are located at opposite ends of shell 164 as shown in FIG. 7, provide the user greater flexibility as to the direction eraser 24 can be pointed and still have photodiode 80 in primary base 12 detect either electromagnetic wave signal 72A or electromagnetic wave signal 72B.

Upon the detection of either electromagnetic wave signal 72A or electromagnetic wave signal 72B, the operation of primary base 12 is the same as that described for mobile element !8 in connection with FIG. 2. CPU 44 determines $D_{B1}$ which equals $T_{B1}$ multiplied by the speed of sound, and $T_{pw}$ is meaured by timer 124. (The subscripts "A" and "B" of the parameters used herein identify the particular microphone and receiver to which the parameters pertain.) The value of $T_{pw}$ identifies mobile element 22 as that which includes eraser 24 and indicates the contact orientation of eraser 24, i.e., the portion of eraser 24 that contacts writing surface 12. Membrane switches 106A-106D are located in shell 164 of mobile element 22, as shown in dashed lines in FIG. 7. Whenever eraser 24 comes into contact with writing surface 16, at least one of membrane switches 106A-106D is closed.

Figure 6:
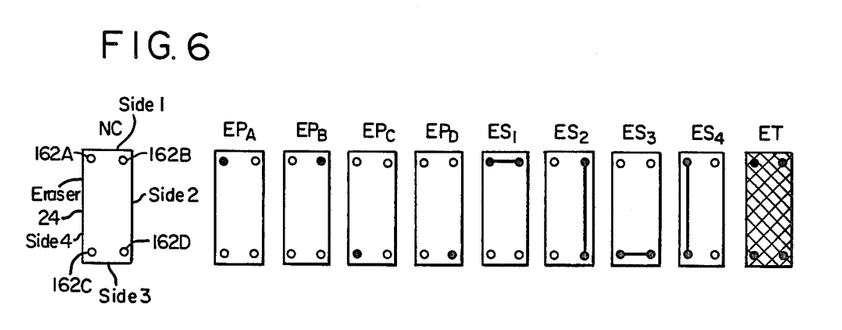
FIG. 6 illustrates the various orientations in which the eraser can contact a writing surface.

The number and identity of the membrane switches that are open or closed depends on the position in which eraser 24 contacts writing surface 16. There are nine combinations of open and closed conditions of switches 106A-106D that may be obtained. FIG. 6 illustrates the nine combinations. In FIG. 6, rectangles represent eraser 24 and circles in the corners of the rectangles represent switches 106A-106D. Shaded areas represent contact between eraser 24 and writing surface 16. The symbols appearing above erasers 24 have the following meanings. NC indicates no contact; $EP_A$ to $EP_D$ indicates that eraser 24 is in contact with writing surface 16 only at the point immediately adjacent to switches 106A to 106D, respectively; $ES_1$ to $ES_4$ indicates that eraser 24 is in contact with writing surface 16 along sides 1 to 4, respectively; and ET indicates that eraser 24 is in total contact with writing surface 16.

Having obtained $D_{B1}$, CPU 44 next determines $D_{B2}$ by activating pulse 48 which causes ultrasonic signal 42 to be transmitted. Switch 156 again provides a conduction path for the output of microphone 36B, and LED 70A and LED 70B again transmit electromagnetic wave signals 72A and 72B, respectively. Primary base 12 determines $T_{B2}$ in the same manner it determined $T_{B1}$. CPU 44 then computes $D_{B2}$, which equals $T_{B2}$ multiplied by the speed of sound. CPU 44 then repeats the process to obtain $D_{A1}$ and $D_{A2}$, with switch 156 providing a conduction path for the output of microphone 82A. Having obtained $D_{A1}$, $D_{A2}$, $D_{B1}$, $D_{B2}$ and $T_{pw}$, CPU 44 computes the position coordinates $x_A$, $y_A$ and $x_B$ and $y_B$ for points $M_A(x,y)$ and $M_b(x,y)$ of mobile element 22 according to equations (6) and (7). The position coordinates $x_A$, $y_A$, $x_B$, $y_B$ and the $T_{pw}$ value uniquely identify the portion of writing surface 16 eraser 24 contacts. In the preferred embodiment, the size and shape of eraser 24 are previously stored in CPU 44. By using $x_A$, $y_A$, $x_B$, $Y_B$, and $T_{pw}$, CPU 44 can derive a set of x and y position coordinates for the portion of writing surface 16 on which eraser 24 contacts. CPU 44 provides on output 134 a signal indicating to the external computer that the x and y position coordinates are to be erased from rather than written into the external computer memory map.

FIG. 8 illustrates the preferred embodiment of mobile element 18 that includes writing instrument 20. Writing instrument 20 is a standard whiteboard pen which is removably placed in a shell 170. As its tip 28 is pressed against writing surface 16, writing instrument 20 is pressed against membrane switch 66. Mobile element 18 also includes an electronic housing 172 and a battery housing 174 that are connected to shell 170 through a microphone contact 176, LED contact 178, voltage contact 180, and ground contacts 182, 184, and 186. Ultrasonic signals 42 and 78 are received through acoustic openings 188, and electromagnetic wave signal 72 is transmitted by infrared LED 70.

It will be obvious to those having skill in the art that many changes may be made in the abovedescribed details of the preferred embodiment of the present invention without departing from the underlying principles thereof. The scope of the present invention should be determined, therefore, only by the following claims.

I claim:

1. A graphic input system for determining position coordinate data of a mobile element, comprising:
   transmitting means for transmitting signals;
   mobile receiving means connected to the mobile element for receiving the signals;
   mobile transmitting means for transmitting an electromagnetic signal in response to receipt of the signals by the mobile receiving means;
   electromagnetic signal receiving means for receiving the electromagnetic signal;
   timing means for determining the time elapsed between the transmission of the signals and the receipt of the electromagnetic signal; and
   coordinate calculating means for calculating the position coordinate data from the elapsed time.

2. The system of claim 1 wherein the signals comprise a first signal and a second signal and the transmitting means includes a first and second transmitting means for transmitting the first signal and the second signal, respectively, and the system further comprises transmitter distance determining means for determining the distance between the transmitting means, wherein the coordinate calculating means uses the distance in calculating the position coordinate data.

3. The system of claim 1 further comprising a writing surface and wherein the mobile element comprises an eraser.

4. The system of claim 3 wherein the mobile receiving means comprises at least one receiving means for receiving the signals, and switching means for disabling all but one of the receiving means at a time; and the mobile transmitting means is responsive to only one receiving means at a time.

5. The system of claim 3 further comprising:
   at least one eraser contact switch means corresponding to at least one point on the eraser for determining whether the eraser is in contact with the writing surface at each point;
   contact switch encoding means for encoding the electromagnetic signal with information that represents the combination of eraser points in contact with the writing surface; and
   electromagnetic signal decoding means connected to the electromagnetic signal receiving means for determining the combination of points in contact with the writing surface.

6. The system of claim 3 further comprising:
   eraser size and shape encoding means for encoding the electromagnetic signal with information that represents the size and shape of the eraser; and
   electromagnetic signal decoding means connected to the electromagnetic signal receiving means for determining the size and shape of the eraser.

7. The system of claim 1 wherein the signals are of the ultrasonic type.

8. The system of claim 1 further comprising a writing surface and wherein the mobile element comprises a writing instrument.

9. The system of claim 8 wherein the writing instrument has a tip portion, and further comprising tip switch means for enabling the mobile transmitting means while the tip portion contacts the writing surface.

10. The system of claim 8 wherein the tip portion dispenses ink of a predetermined color and further comprising:
    color encoding means for encoding the electromagnetic signal with information indicating the color of the ink; and electromagnetic signal decoding means connected to the electromagnetic receiving means for determining the color of ink dispensed.

11. The system of claim 8 wherein the tip portion dispenses ink having a predetermined line width and further comprising:
   line width encoding means for encoding the electromagnetic signal with information that represents the width of the line; and
   electromagnetic signal decoding means connected to the electromagnetic receiving means for determining the width of the line.

12. A graphic input system for determining position coordinate data of a mobile element, the apparatus comprising:
   transmitting means for transmitting signals through an atmospheric medium;
   mobile receiving means connected to the mobile element for receiving the signals;
   mobile transmitting means for transmitting an electromagnetic signal in response to receipt of the signals by the mobile receiving means;
   electromagnetic signal receiving means for receiving the electromagnetic signal; and
   coordinate calculating means for calculating the position data from information derived from the electromagnetic signal receiving means.

13. The system of claim 12 further comprising a writing surface and wherein the mobile element comprises an eraser.

14. The system of claim 12 further comprising a writing surface and wherein the mobile element comprises a writing instrument.

15. The system of claim 12 wherein the signals are of the ultrasonic type.

16. A graphic input system for determining position coordinate data of a mobile eraser, comprising:
   transmitting means for transmitting a signal;
   mobile receiving means connected to the mobile eraser for receiving the signal;
   mobile transmitting means for transmitting a response signal in response to receipt of the signal by the mobile receiving means;
   response signal receiving means for receiving response signal; and
   coordinate calculating means for calculating the position coordinate data from information derived from the response signal receiving means.

17. The system of claim 16 wherein the mobile receiving means comprises at least one receiving means for receiving the signals, and switching means for disabling all but one of the receiving means at a time; and the mobile transmitting means is responsive to only one receiving means at a time.

18. The system of claim 16 further comprising:
   a writing surface;
   at least one eraser contact switch means corresponding to at least one point on the eraser for determining whether the eraser contacts the writing surface at each point;
   contact switch encoding means for encoding the response signal with information that represents the combination of eraser points that are in contact with the writing surface; and
   response signal decoding means connected to the response signal receiving means for determining the combination of points in contact with the writing surface.

19. The system of claim 16 further comprising:
   eraser size and shape encoding means for encoding the response signal with information that represents the size and shape of the eraser; and
   response signal decoding means connected to the response signal receiving means for determining the size and shape of the eraser.

20. The system of claim 1 wherein the signals are of the ultrasonic type.

* * * * *

UNITED STATES PATENT AND TRADEMARK OFFICE
CERTIFICATE OF CORRECTION

PATENT NO. : 4,777,329

DATED : October 11, 1988

INVENTOR(S) : Samuel W. Mallicoat

It is certified that error appears in the above-identified patent and that said Letters Patent is hereby corrected as shown below:

Column 1, line 21, after "Rodgers" insert --,--.

Column 3, line 38, change "element" to --elements--.

Column 4, line 16, change "$D_1$represents" to --$D_1$ represents--.

Column 4, line 48, change "$T_1$of" to --$T_L$ of--.

Column 5, line 56, after "by" delete ",".

Column 6, line 21, change "6" to --16--.

Column 8, line 19, change "Thd pw" to --$T_{pw}$--.

Column 9, line 6, change "$T_{ps}$" to --$T_{pw}$--.

Column 9, line 28, change "$T_{ps}$" to --$T_{pw}$--.

UNITED STATES PATENT AND TRADEMARK OFFICE
CERTIFICATE OF CORRECTION

PATENT NO. : 4,777,329

DATED : October 11, 1988

INVENTOR(S) : Samuel W. Mallicoat

It is certified that error appears in the above-identified patent and that said Letters Patent is hereby corrected as shown below:

Column 9, line 48, change "8" to --18--.

Column 10, line 31, change "D" to --$D_1$--.

Column 10, line 58, change "!8" to --18--.

Column 11, line 22, change "pulse" to --pulser--.

Column 11, line 61, change "abovedescribed" to --above-described--.

Signed and Sealed this

Seventh Day of March, 1989

*Attest:*

DONALD J. QUIGG

*Attesting Officer*   *Commissioner of Patents and Trademarks*